Dec. 11, 1934.     D. EISINGA     1,983,843
COMBINED FURNACE AND DOMESTIC HOT WATER HEATING APPARATUS
Filed Nov. 29, 1932     2 Sheets-Sheet 1

INVENTOR
Dirk Eisinga
BY Fred C. Matheny
ATTORNEY

Dec. 11, 1934.   D. EISINGA   1,983,843
COMBINED FURNACE AND DOMESTIC HOT WATER HEATING APPARATUS
Filed Nov. 29, 1932   2 Sheets-Sheet 2

INVENTOR
Dirk Eisinga
BY
Fred C. Matheny
ATTORNEY

Patented Dec. 11, 1934

1,983,843

UNITED STATES PATENT OFFICE 1,983,843

COMBINED FURNACE AND DOMESTIC HOT WATER HEATING APPARATUS

Dirk Eisinga, Glendale, Calif., assignor to National Steel Construction Co., Seattle, Wash., a corporation of Washington Application November 29, 1932, Serial No. 644,760

7 Claims. (Cl. 126—101)

My invention relates to a combined furnace and domestic water heating apparatus and the general object of my invention is to provide apparatus of this nature having means by which substantially all of the heat developed in the furnace may be directed through the water heater and applied to the heating of water or by which substantially all of said heat may be directed through heat pick up chambers and applied to the heating of rooms with which the furnace is connected.

A further object is to provide apparatus of this nature in which a water heater is directly connected with the combustion chamber of a furnace by a relatively large passageway through which substantially all of the heated products of combustion may be caused to pass directly to the water heater without entering the heat pick up spaces of the furnace.

A further object is to provide a combined furnace and domestic water heater by which the water in the usual domestic hot water tank may be very quickly heated, and in which, if desired, the said water may be heated without heating the rooms with which the furnace is connected, thus making it possible to use the water heater freely in warm weather without heating the house in which the furnace is installed.

A further object is to provide a combined furnace and domestic water heater in which the water heater may be divided into two sections and in which one of said sections may be arranged so that it is always subjected to heat from the discharging smoke and flue gases when the furnace is in operation.

A further object is to provide a combined furnace and domestic water heater in which the usual hot water tank may be done away with in smaller installations, the capacity of the water heater being sufficient to maintain an ample supply of hot water in a system where rapid heating of the water is possible.

Devices commonly used in connection with furnaces for domestic water heating are usually in the nature of water coils or conduits positioned within the combustion chamber of the furnace or in the path of the discharging flue gases or in some other location where the heating of the water is incidental and occurs in the normal house heating operation of the furnace. In installations of this nature it is obviously necessary to heat up the room heating equipment of the furnace in order to heat water for domestic purposes. This may result in heating up the rooms with which the furnace is connected in an undesirable manner or, if the heat as hot air or hot water is cut off from the rooms it may result in needless waste of heat and slow heating of the water. Because of these difficulties it is now common practice to use electric water heaters and gas water heaters in addition to the water heating means usually used in connection with the furnaces.

My present invention overcomes these difficulties and provides domestic water heating means in connection with an oil burning furnace, which water heating means insures quick and easy heating of the water at very low cost, with very little waste of heat and without heating up the rooms with which the furnace is connected.

Other and more specific objects of the invention will be apparent from the following description taken in connection with the accompanying drawings.

In the drawings, Fig. 1, is a sectional view of a combined furnace and domestic water heater constructed in accordance with my invention.

Figure 1:
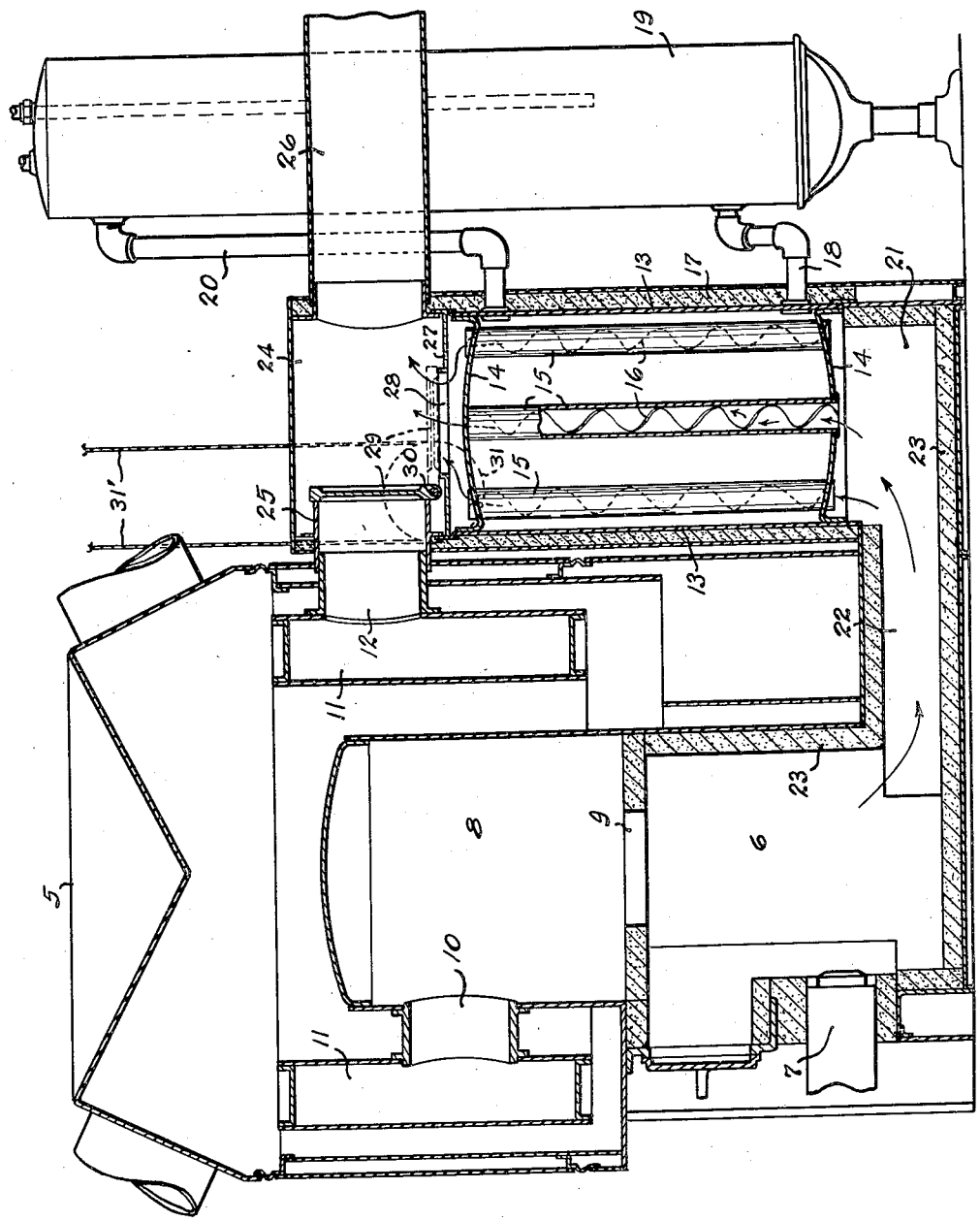

Referring to Fig. 1, the numeral 5 designates a furnace having a combustion chamber 6 in its lower portion into which fuel may be delivered as by an oil burner 7. A heating dome 8 is positioned above the combustion chamber 6 and communicatively connected therewith through a somewhat restricted orifice 9 formed in a wall of fire brick or similar heat insulating material.

The dome 8 is connected by a conduit 10 with a cylindrical drum 11 through which the hot gases may circulate while giving up their heat. A discharge conduit pipe 12 is connected with the drum 11 preferably diametrically opposite to the conduit 10. The dome 8 and drum 11 constitute a heat pick up chamber of a conventional type, it being understood that any desired form of heat pick up means, as a hot air or hot water type heat pick up may be used in connection with this invention, said heat pick up means essentially affording a chamber or passageway for the heated gases.

The water heater disclosed in Fig. 1, is illustrative of one preferred form of my invention. This water heater comprises a water tight drum having side walls 13 and end walls 14 and having tubes 15 extending lengthwise therethrough from one end wall 14 to the other, said tubes being open at both ends. Spiral fins 16 may be provided in the tubes 15 to impart a whirling motion to the hot gases as they pass therethrough. These fins increase the heating efficiency of the tubes. A jacket 17 of insulating material preferably encloses the water heater to prevent losses due to radiation. Water conduit means 18 may connect the lower portion of the water heater with the lower portion of a domestic hot water tank 19 of well known form and other water conduit means 20 may connect the upper portion of said water heater with the upper portion of said hot water tank 19. This completes a water circulating system by which cold water from the lower end of tank 19 may enter the lower end of the water heater, thence pass upwardly through said water heater and be heated and thence pass through the conduit 20 into the upper end of the hot water tank 19.

The space within the water heater surrounding the tubes 15 affords a relatively large water storage capacity and I find that in connection with small domestic heating plants it is entirely practical to dispense with the hot water storage tank 19, connect the pipe 18 with a source of supply of cold water and connect the hot water draw off pipes in the house with the pipe 20. In an installation this saves the cost of the hot water storage tank 19.

A chamber 21 is provided at the lower end of the water heater. This chamber 21 is connected by a passageway 22 with the combustion chamber 6 of the furnace. The chamber 21, passageway 22 and interior of the combustion chamber 6 are all lined with suitable heat insulating refractory material as indicated at 23. The passageway 22 is relatively large so that substantially all of the heated gases and other products of combustion may pass therethrough when the other outlet from the combustion chamber 6 is closed by closing conduit 12 of the drum 11, as hereinafter described.

At the upper end of the water heater I provide a chamber 24 which is connected by a tubular fitting 25 with the outlet conduit 12 from the heat pick up chambers 11 and 8. The chamber 24 is also connected with a smoke discharge pipe or flue 26. A wall 27 is provided at the bottom of the chamber 24 and in spaced relation above the upper end wall 14 of the water heater. An opening 28 is provided in the wall 27. A damper 29 is provided as at 30 and is movable into one position to cover the opening 28 and leave the opening in the end of the fitting 25 uncovered and into another position to cover the opening in the end of the fitting 25 and leave the opening 28 uncovered. This damper may be operated manually or it may be automatically operated by thermostatically controlled means. I have shown a sheave 31 on the pivot 30, said sheave being connected with flexible connector means 31' by which it may be turned in well known manner to move the damper 29.

When the damper 29 is closed as respects the fitting 25 and open as respects the opening 28, as shown by full lines in Fig. 1, then substantially all of the heat generated by the oil burner 7 will travel along the passageway 22 and up through the water heater tubes 16 thus using substantially all of the heat to heat the water and making it possible to heat all of the water in the tank 19 in a very short time. As soon as the water in the tank 19 has been thus heated, the damper 29 is moved, usually by thermostatically controlled means, not shown, to the horizontal position indicated by dot and dash lines, thus closing the opening 28 and leaving the opening through the fitting 25 wide open. This shuts off all circulation of heat through the water heater and permits the furnace to operate in the normal manner to heat the rooms with which it is connected.

While the water is being heated substantially all of the heat is being passed through the water heater and very little heat is being dissipated in the heat pick up chambers. This makes it possible to heat water in warm weather without heating up the rooms with which the furnace is connected. The opening 9 of restricted area between the combustion chamber 6 and the dome 8 affords a free passage for the heated combustion gases when the heat pick up chambers 8 and 11 are in communication with the smoke pipe 26 but the restriction of said opening tends to prevent heating of the heat pick up chambers by reflected heat when the outlet 12 is closed and the outlet 28 open.

Figure 2:
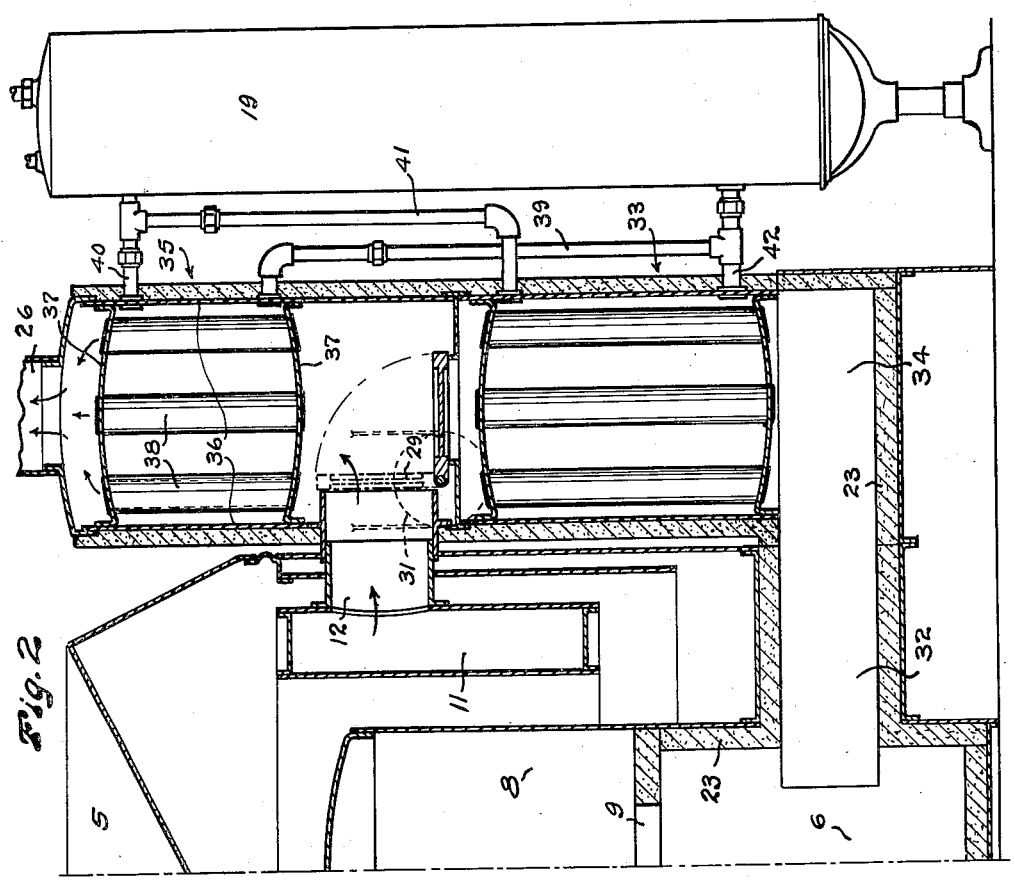
Fig. 2 is a sectional view of a modified form of the same parts being omitted.

The furnace shown in Fig. 2, is similar to the furnace shown in Fig. 1, except that the passageway 32 which connects the combustion chamber with the water heater intersects the combustion chamber at a higher elevation. The lower section of the water heater, designated generally by 33, is similar to the water heater shown in Fig. 1, except that it may be shorter. A chamber 34 at the lower end of water heater section 33 is connected with the passageway 32 which leads to the combustion chamber. In addition to this lower water heater section 33 I provide an upper water heater section, designated generally by 35. This upper water heater section may consist of a cylindrical drum 36 having end walls 37 and heat conducting tubes 38. The lower portion of the upper water heater section 35 is connected by pipe means 39 with the lower end of a hot water tank 17 and the upper portion of said upper water heater section 35 is connected by pipe means 40 with the upper portion of the hot water tank 17, the upper portion of the lower water heater section 33 is connected by pipe means 41 with the upper portion of the hot water tank 19 and other pipe means 42 connects the lower portion of the lower water heater section with the lower portion of the hot water tank 19. This provides an independent water circulation between each section of the water heater and the tank 19, which I find is more satisfactory than connecting the two sections 33 and 35 in series.

In this form of heater the smoke pipe or flue 26 is connected with the upper end of the upper water heater section 35 so that the upper water heater section 35 is always subjected to the heat of the discharging gases when the oil burner is in operation.

When the damper 29 is in the horizontal position shown by full lines in Fig. 2, a major portion of the heat generated in the furnace will be devoted to heating the rooms but the gases discharging from the heat pick up chamber will pass through the upper water heater section 35 thus utilizing heat which would otherwise be wasted to help heat the water in the hot water tank.

To quickly heat up the water in the tank 19 shown in Fig. 2, the damper 29 is moved to the vertical position. This closes the passageway between the heat pick up chambers and the smoke pipe and causes substantially all of the heated products of combustion to be passed through the passageway 32 and through both the lower and upper water heater sections 33 and 35 thus making substantially all of the energy of the furnace available for the purpose of heating water.

Figure 3:
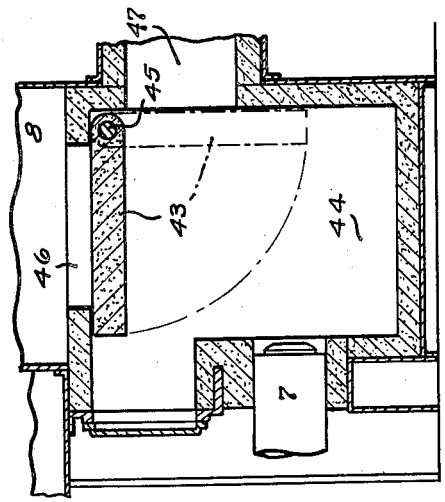
Fig. 3, is a fragmentary sectional view of another modified form of my invention.

In Fig. 3, I have shown a modified form of damper means for selectively directing all of the heat from the combustion chamber either through the water heater or through the heat pick up means of the furnace, said damper means being in the nature of a damper 43 of refractory material disposed in the combustion chamber 44 and pivoted as at 45 in such a position that it may be moved to cover either one of two openings 46 or 47, it being understood that one of said openings is always left open and uncovered when the other opening is covered by the damper. When the damper 43 is in the horizontal position as shown by full lines in Fig. 3, then all of the heat from the combustion chamber will essentially pass through the opening 47 and will be applied to heating the water in the water heater. When the damper 43 is in the vertical position shown by dot and dash lines in Fig. 3 then the passageway to the lower portion of the water heater will be closed and all of the heat from the combustion chamber will pass to the heat pick up chambers of the furnace. The damper 43 provides a means for completely closing the passageway to the heat pick up chamber thus insuring that there will be no heating of the rooms with which the furnace is connected when the water heater is used in warm weather.

The foregoing description and accompanying drawings disclose what I now regard as a preferred embodiment of my invention but it will be understood that this disclosure is merely illustrative and that such changes in the invention may be made as are fairly within the scope and spirit of the following claims.

I claim:

1. In a combined room heating and domestic water heating apparatus; a furnace having a combustion chamber; a smoke pipe; means forming two heat take off passageways connected with said combustion chamber and said smoke pipe at opposite ends; domestic water heater means positioned in one of said heat take off passageways; movable damper means operatively positioned between the smoke pipe and the adjacent ends of said two passageways, and means to selectively move said damper means to close either of said passageways and leave the other passageway open.

2. In a combined room heating and domestic water heating apparatus; a furnace having a combustion chamber; a smoke pipe; means forming two separate passageways connecting said combustion chamber with said smoke pipe, each of said passageways being relatively large whereby all of the combustion products from said combustion chamber may pass through either of said passageways during operation of the furnace; domestic water heater means positioned in one of said passageways; movable damper means operatively positioned between the smoke pipe and the adjacent ends of said two passageways, and means to selectively move said damper means to close either of said passageways and leave the other passageway open.

3. In a combined room heating and domestic water heating apparatus; a furnace having a combustion chamber; a smoke pipe; means forming two separate passageways for heated products of combustion, each of said passageways being relatively large whereby all of the combustion products from said combustion chamber may pass through either of said passageways during operation of the furnace, both of said passageways being communicatively connected at the inlet end with said combustion chamber and at the outlet end with said smoke pipe; a damper operatively positioned between said smoke pipe and the outlet ends of said two passageways; damper moving means whereby said damper may be selectively moved to close either of said passageways and leave the other passageway open; heat pick up means in one of said passageways and domestic water heater means in the other passageway.

4. In a combined room heating and domestic water heating apparatus; a furnace having a combustion chamber and having a heat pick up chamber positioned above said combustion chamber and in communication therewith; a smoke pipe communicating with said heat pick up chamber; a domestic water heater positioned at one side of said combustion chamber and having its lower portion communicatively connected with the lower portion of said combustion chamber by a relatively large passageway through which substantially all of the heated products of combustion may pass, the upper portion of said water heater being in communication with said smoke pipe; a movable damper positioned adjacent the point of connection of said smoke pipe with said heat pick up chamber and said water heater and means for moving said damper whereby said smoke pipe may be relatively connected either with said heat pick up chamber or with said water heater.

5. In a combined room heating and domestic water heating apparatus; a furnace having a combustion chamber and having a heat pick up chamber positioned above said combustion chamber and in communication therewith; a domestic water heater positioned at one side of said combustion chamber, said water heater having water circulation means and having upright passageways through which heated gases may pass and said water heater having a chamber at the lower end having another chamber at the upper end; means forming a relatively large passageway connecting said combustion chamber with the lower chamber of said water heater through which passageway substantially all of the heated products of combustion from said combustion chamber may pass; a smoke pipe connected with the chamber at the upper end of said water heater; a conduit connecting the heat pick up chamber with the upper chamber of said water heater and a movable damper having two operative positions into which it may be moved to selectively connect either said heat pick up chamber or said water heater passageways with said smoke pipe.

6. In a combined room heating and domestic water heating apparatus; a furnace having a combustion chamber and a heat pick up chamber; a domestic water heater having two water heating sections; means forming a relatively large passageway directly connecting the lower portion of said water heater and said combustion chamber; a chimney connected with the upper portion of said water heater; conduit means connecting said heat pick up chamber with the space between the two sections of said water heater and movable damper means positioned to selectively close the passageway through the lower water heater section or through the heat pick up means.

7. In a combined room heating and domestic water heating apparatus; a furnace having a lower combustion chamber and an upper heat pick up chamber communicatively connected with each other; a water heater having two sections positioned in spaced apart relation one above another; a smoke pipe connected with the upper portion of the upper water heater section; means forming a relatively large passageway directly connecting the lower portion of said water heater and said combustion chamber; water circulation means interconnecting said two water heater sections; a conduit connecting said heat pick up chamber with the space between said two water heater sections; a damper, and damper moving means for said damper, whereby said damper may be selectively moved into one position to open said conduit to said heat pick up chamber and close the passageway through the lower water heater section and may be moved into another position to close said conduit to said heat pick up chamber and open said passageway through said lower water heater section.

DIRK EISINGA.